US010728043B2

(12) United States Patent
Moses (10) Patent No.: US 10,728,043 B2
(45) Date of Patent: Jul. 28, 2020

(54) METHOD AND APPARATUS FOR PROVIDING SECURE COMMUNICATION AMONG CONSTRAINED DEVICES

(71) Applicant: Entrust, Inc., Dallas, TX (US)

(72) Inventor: Timothy Edward Moses, Ottawa (CA)

(73) Assignee: Entrust, Inc., Dallas, TX (US)

( * ) Notice: Subject to any disclaimer, the term of this patent is extended or adjusted under 35 U.S.C. 154(b) by 78 days.

(21) Appl. No.: 15/215,047

(22) Filed: Jul. 20, 2016

(65) Prior Publication Data

US 2017/0026185 A1 Jan. 26, 2017

Related U.S. Application Data

(60) Provisional application No. 62/195,032, filed on Jul. 21, 2015.

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/083* (2013.01); *H04L 9/0825* (2013.01);
(Continued)

(58) Field of Classification Search
CPC ..... H04L 9/3263; H04L 9/006; H04L 9/0825; H04L 9/083; H04L 9/0833; H04L 9/0891;
(Continued)

(56) References Cited

U.S. PATENT DOCUMENTS 6,108,788 A * 8/2000 Moses .................... G06F 21/602
713/155
6,314,517 B1 * 11/2001 Moses ................ G06Q 20/3821
705/76
(Continued)

FOREIGN PATENT DOCUMENTS

CN 104732636 A * 6/2015
JP 01062044 A * 3/1989

OTHER PUBLICATIONS

Cirani, Simone, Luca Davoli, Gianluigi Ferrari, Rémy Léone, Paolo Medagliani, Marco Picone, and Luca Veltri. "A scalable and self-configuring architecture for service discovery in the internet of things." IEEE Internet of Things Journal 1, No. 5 (2014): 508-521. (Year: 2014).*

(Continued)

*Primary Examiner* — Luu T Pham
*Assistant Examiner* — Walter J Malinowski
(74) *Attorney, Agent, or Firm* — Faegre Drinker Biddle & Reath LLP (57) ABSTRACT

In one example, an apparatus such as an authorization server and method for secure communication between constrained devices issues cryptographic communication rights among a plurality of constrained devices. Each of the plurality of constrained devices comprises no more than one cryptographic algorithm code module per cryptographic function. The method includes receiving a cryptographic communication rights request associated with at least a first of the plurality of constrained devices in response to a cryptographic algorithm update request, and includes providing a response including an identification of a subset of the plurality of constrained devices that have cryptographic communication rights with the identified first of the plurality of constrained devices. A software update server then (Continued)

updates the cryptographic code modules in the sub-set of the plurality of constrained devices.

7 Claims, 7 Drawing Sheets

(51) Int. Cl.
*H04L 9/08* (2006.01)
*H04L 9/00* (2006.01)
*H04L 9/16* (2006.01)
*H04L 9/30* (2006.01)

(52) U.S. Cl.
CPC .......... *H04L 9/0833* (2013.01); *H04L 9/0891* (2013.01); *H04L 9/16* (2013.01); *H04L 9/30* (2013.01); *H04L 9/3234* (2013.01); *H04L 63/0435* (2013.01); *H04L 63/06* (2013.01)

(58) Field of Classification Search
CPC . H04L 9/16; H04L 9/30; H04L 9/3234; H04L 63/0435; H04L 63/06
USPC ......................................................... 713/156
See application file for complete search history.

(56) References Cited

U.S. PATENT DOCUMENTS

| | | | | |
|---|---|---|---|---|
| 8,621,237 B1* | 12/2013 | Bailey | .................. | G06F 21/602 713/189 |
| 9,094,407 B1* | 7/2015 | Matthieu | .................. | H04W 4/70 |
| 9,552,485 B1* | 1/2017 | Cignetti | ............... | G06F 21/602 |
| 9,754,100 B1* | 9/2017 | Hitchcock | ............... | G06F 21/45 |
| 9,838,390 B2* | 12/2017 | Zakaria | .................. | H04W 4/70 |
| 9,900,171 B2* | 2/2018 | Guedalia | ................. | H04L 67/16 |
| 2002/0166061 A1* | 11/2002 | Falik | .................. | G06F 12/1425 726/34 |
| 2003/0004688 A1* | 1/2003 | Gupta | ..................... | G06F 21/55 702/188 |
| 2004/0205349 A1* | 10/2004 | Vaha-Sipila | ............ | G06F 21/53 713/182 |
| 2005/0055463 A1* | 3/2005 | Saunders | ........... | H04L 63/0209 709/246 |
| 2005/0108571 A1* | 5/2005 | Lu | ........................... | G06F 21/34 726/4 |
| 2005/0129234 A1* | 6/2005 | Duval | ................... | H04N 7/163 380/239 |
| 2006/0041938 A1* | 2/2006 | Ali | ....................... | G06Q 20/341 726/14 |
| 2006/0064443 A1* | 3/2006 | Duval | ................ | H04N 21/6334 |
| 2006/0187857 A1* | 8/2006 | Imai | .................... | H04L 12/2803 370/254 |
| 2007/0005976 A1* | 1/2007 | Riittinen | ................. | H04L 51/12 713/175 |
| 2007/0076886 A1* | 4/2007 | Hori | ..................... | H04L 63/068 380/277 |
| 2007/0248232 A1* | 10/2007 | Driscoll | ............... | H04L 9/0822 380/280 |
| 2008/0175388 A1* | 7/2008 | Okabe | ................... | H04L 63/104 380/277 |
| 2008/0184030 A1* | 7/2008 | Kelly | .................... | H04L 9/3268 713/156 |
| 2008/0292105 A1 | 11/2008 | Wan et al. | | |
| 2009/0060189 A1* | 3/2009 | Osajima | ............... | H04L 9/0833 380/259 |
| 2009/0129586 A1* | 5/2009 | Miyazaki | .................. | H04L 9/00 380/28 |
| 2010/0175061 A1* | 7/2010 | Maeda | ..................... | G06F 8/65 717/173 |
| 2010/0290622 A1* | 11/2010 | Garcia Morchon | .. | H04W 12/04 380/273 |
| 2010/0322423 A1* | 12/2010 | Boehler | .................. | G01P 1/122 380/255 |
| 2011/0145597 A1* | 6/2011 | Yamaguchi | ............. | G06F 21/10 713/189 |
| 2012/0151213 A1* | 6/2012 | Xiao | ..................... | H04L 12/283 713/168 |
| 2012/0317037 A1* | 12/2012 | Routhenstein | ... | G06K 19/06196 705/75 |
| 2013/0173910 A1* | 7/2013 | Hong | ..................... | H04W 12/04 713/153 |
| 2013/0276019 A1* | 10/2013 | Liu | ......................... | G06F 21/30 725/31 |
| 2014/0059352 A1* | 2/2014 | Haga | ..................... | H04L 9/0822 713/171 |
| 2014/0068274 A1* | 3/2014 | Kasatkin | ................. | G06F 21/64 713/189 |
| 2014/0153724 A1* | 6/2014 | Kim | ..................... | H04L 63/0428 380/270 |
| 2014/0244833 A1* | 8/2014 | Sharma | ................... | H04L 67/16 709/224 |
| 2014/0359098 A1* | 12/2014 | Xu | ............................ | H04L 67/10 709/223 |
| 2015/0029880 A1* | 1/2015 | Burns | ...................... | H04W 4/70 370/252 |
| 2015/0130630 A1* | 5/2015 | Outwater | ................ | G01D 4/006 340/870.02 |
| 2015/0193694 A1* | 7/2015 | Vasseur | ................. | G06N 99/005 706/12 |
| 2015/0215125 A1* | 7/2015 | Park | ..................... | H04L 63/1466 380/255 |
| 2015/0279132 A1* | 10/2015 | Perotti | ............... | G07C 9/00309 340/5.52 |
| 2016/0013948 A1* | 1/2016 | Moses | ................. | H04L 63/0823 713/156 |
| 2016/0212099 A1* | 7/2016 | Zou | ...................... | H04L 63/0263 |
| 2016/0277933 A1* | 9/2016 | Moon | .................... | H04W 4/70 |
| 2016/0366102 A1* | 12/2016 | Smith | ................... | H04L 63/045 |
| 2017/0005820 A1* | 1/2017 | Zimmerman | ........... | H04L 67/10 |
| 2017/0187536 A1* | 6/2017 | Meriac | .................. | H04L 9/3247 |
| 2017/0243012 A1* | 8/2017 | Karame | ................ | H04L 9/0637 |
| 2018/0331906 A1* | 11/2018 | George | ................... | G06F 9/542 |

OTHER PUBLICATIONS

Li, Chunxiao, Niraj K. Jha, and Anand Raghunathan. "Secure reconfiguration of software-defined radio." ACM Transactions on Embedded Computing Systems (TECS) 11, No. 1 (2012): 10. (Year: 2012).*
Rauter, Tobias, Andrea Höller, Nermin Kajtazovic, and Christian Kreiner. "Privilege-based remote attestation: Towards integrity assurance for lightweight clients." In Proceedings of the 1st ACM Workshop on IoT Privacy, Trust, and Security, pp. 3-9. 2015. (Year: 2015).*
Mahalle, Parikshit N., Bayu Anggorojati, Neeli Rashmi Prasad, and Ramjee Prasad. "Identity driven capability based access control (ICAC) scheme for the Internet of Things." In 2012 IEEE International Conference on Advanced Networks and Telecommunciations Systems (ANTS), pp. 49-54. IEEE, 2012. (Year: 2012).*
European Patent Office; International Search Report and Written Opinion; International Application No. PCT/US2016/043272; dated Oct. 24, 2016.

* cited by examiner

METHOD AND APPARATUS FOR PROVIDING SECURE COMMUNICATION AMONG CONSTRAINED DEVICES

RELATED APPLICATIONS

This application claims priority to Provisional Application Ser. No. 62/195,032, filed on Jul. 21, 2015, having inventor Timothy E. Moses, titled "METHOD AND APPARATUS FOR PROVIDING SECURE COMMUNICATION AMONG CONSTRAINED DEVICES", and is incorporated herein by reference.

BACKGROUND OF THE DISCLOSURE

The disclosure relates to methods and apparatus for providing secure communications among devices such as constrained devices in a network.

In proposed models for providing security for the Internet of Things, there are two proposed authentication infrastructures, either or both of which may use public key infrastructure (PKI) technology and certificates. For example, when connecting multiple devices to a network (or to each other), via the Internet, a first security infrastructure may install credentials in the devices that uniquely identify each device. These identification credentials may be unmanaged from a security perspective and are independent of the domain of use. For example, when a device that can be connected to a network is manufactured, such as temperature sensors and thermostats to be installed in multiple floors of a large building, the manufacturer may have a server or use a server of a third party as a root certificate server and generate identification certificates for each of the devices that are produced by the manufacturer. As such, during manufacture, a database may be created with an entry correlating a unique identifier of the device with a certificate that is signed by the root certificate authority. In this manner, when a device is turned on, it may authenticate via a network, to the root authority or to another certification authority.

However, a different security infrastructure may be used for managing the configuration of the device when it is installed. As such, generic devices need to be added as new devices in a system or network and then the device needs to be configured to operate in a particular manner consistent with the needs of the system or network. For example, another authorization infrastructure may be used for managing authorization such as which devices are authorized on a network, which devices are authorized to communication with certain other devices, which devices can send which commands to which interfaces of which other devices in a network and their configuration settings. With a growing number of devices having to be installed in larger networks such as building networks, roadside infrastructures, manufacturing facilities, and other environments, each device is enrolled in a database of the second infrastructure.

As cryptanalytic capabilities advance, and certain cryptographic algorithms cease to be adequately secure for their purpose, it is necessary to continuously update the cryptographic algorithms and keys in use, while continuing to support parts of the network that have yet to update their algorithms. This presents a problem because both parties to a communication must use the same algorithm, yet it is impractical to update all devices 102-102n simultaneously. This problem is usually solved by supporting a range of algorithms in devices that accept connections and messages, even obsolete ones. Devices that originate connections and messages must only support any one of the algorithms supported by the other parties with which it communicates. The cost paid for this solution is that all parties that accept connections and messages must support multiple algorithms and have keys suitable for use with each. In a network of constrained devices this cost may be unacceptable. A constrained device as used herein is one that stores one cryptographic algorithm code module per cryptographic function in memory. A code module as used herein is stored executable instructions that when executed by one or more processors, causes the one or more processors to perform operations as dictated by the stored instructions of the code module.

Figure 1:
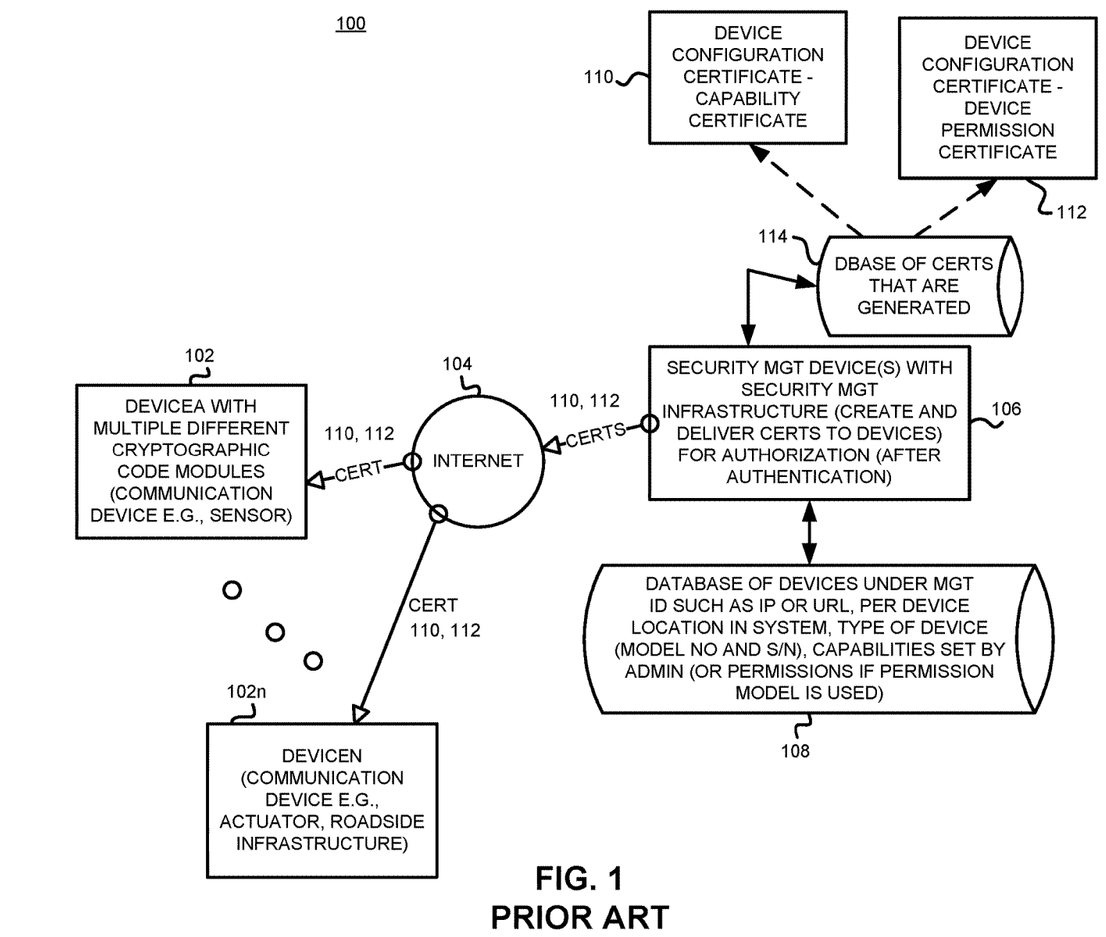
FIG. 1 is a block diagram illustrating one example of a prior art system.

Referring to FIG. 1, a system 100 is shown with a plurality of devices 102 and 102n, that are to be added in a network, such as a network that employs the Internet 104. The devices may be sensors, actuators, roadside infrastructure elements, or any other suitable device that can network with the Internet or other network. Enrolling the devices 102-102n may be typically done in a batch process at a central location and then shipped to be installed. An administrator would need to review a plan of an overall system and try to figure out how to configure the devices.

In this example, a security management device 106 or authorization server that is part of a security management infrastructure, in this case a PKI infrastructure, populates a database 108, through an administrator interface at a server or other computer as part of the device 106, with data needed to issue device configuration certificates that are then issued to the devices 102-102n to configure the devices to operate as required by the network. Networks of sensors and actuators may use the authorization server that controls the privileges of the devices of which the network is formed; dictating which devices are permitted to access which functions on which other devices.

Each device has a suitable network interface to communicate with the network and with each other, and in this example, includes an IP address or URL. In one example, the security management device 106 may generate device configuration certificates in a capability certificate model shown as certificate 110 and/or device configuration certificates based on a device permission certificate model, shown as certificate 112. The device configuration certificates may be stored in a certificate database 114 as known in the art. An example of a device configuration certificate based on a capability certificate model would be a certificate, for example, signed by the security management device 106 or other suitable certification authority. The device configuration certificate that is based on a device capability certificate would include, for example, the device ID, such as a serial number, IP address, URL or other identifier, as well as data representing the commands the particular device can emit and which devices are authorized to communicate with other devices in the network. A device configuration certificate that is based on a device permission certificate 112 through a permission model may generate a certificate that includes the same type of device ID information and data identifying what commands a device can accept. The database 108 may include, for example, the device ID for each device in the network and a per device location such as the position of the device within the system. For example if the device is a sensor in a one of many pipes, its position within a particular pipe with respect to a particular junction of pipes or other location information has to be determined by an administrator. The database 108 may also include other device information such as the model number and serial number of the device as well as capabilities of the device set by an administrator that may set the parameters through a suitable user interface of the security management device 106. Alternatively, permissions or rules may be stored for a particular set of devices if a permission model is used. The issued device configuration certificates, whether they be based on a capability model or permission model, after generated or issued, are then sent to each respective device so that their configuration is securely administered through a public key infrastructure based security system. As such, a device 102-102n, will only accept a certificate if it can verify that it was signed by a trusted root authority, and changes can only be made to the configuration of the device via the security management device 106.

There is a need for systems that employ constrained devices to maintain secure communication around the devices.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Generally, an apparatus such as an authorization server and method for secure communication between constrained devices issues cryptographic communication rights among a plurality of constrained devices. Each of the plurality of constrained devices comprises no more than one cryptographic algorithm code module per cryptographic function. The method includes receiving a cryptographic communication rights request associated with at least a first of the plurality of constrained devices in response to a cryptographic algorithm update request, and includes providing a response including an identification of a subset of the plurality of constrained devices that have cryptographic communication rights with the identified first of the plurality of constrained devices. A software update server then updates the cryptographic code modules in the sub-set of the plurality of constrained devices.

In one example, the apparatus and method may also provide the response including the identification of the subset of the plurality of constrained devices that have cryptographic communication rights by determining which of the plurality of constrained devices have cryptographic communication rights with the identified first constrained device based on authorized communication rights authorized by the authorization server.

The method may also include provisioning, by a software update server, a replacement cryptographic code module, in response to the cryptographic algorithm update request, to the subset of the plurality of constrained devices that have cryptographic communication rights in common with the identified first of the plurality of constrained devices, wherein the replacement cryptographic code module includes at least one of: a data encryption code module, a key encryption code module, a data signature code module, a key agreement code module and a data digest code module. A data digest code module may, for example, carry out an SHA-1 or an SHA-2 cryptographic operation as known in the art, or any other suitable data digest operation as known in the art.

The apparatus and method may also issue cryptographic communication rights among the plurality of constrained devices by issuing asymmetric key based configuration certificates or symmetric key based tickets to the plurality of constrained devices wherein the configuration certificates assign communication rights to each of the plurality of constrained devices to allow the plurality of constrained devices to cryptographically exchange information between the plurality of constrained devices.

Figure 2:
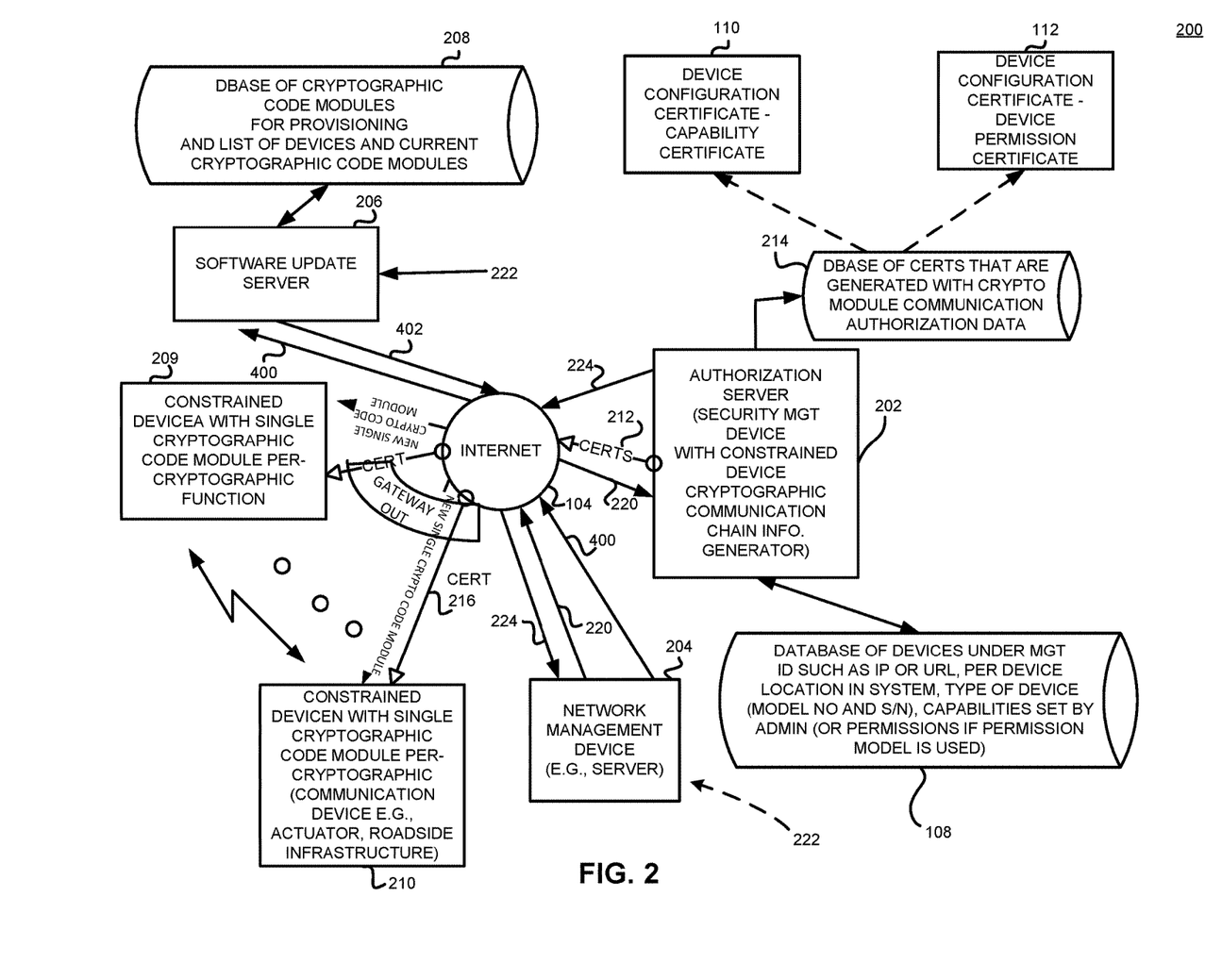
FIG. 2 is a block diagram illustrating one example of a system in accordance with one example set forth in the disclosure.

FIG. 2 illustrates one example of a system 200 that includes an authorization server 202, a network management device 204 (such as a server), a software update server 206 and constrained devices 209-210 that are in communication with one another through a network such as the Internet 104 or any other suitable communication network or networks. A gateway may be employed as shown and as known in the art if desired. The authorization server 202 may include the functionality of the security management device 106 (FIG. 1) and/or may also include additional logic as described herein. The authorization server 202 in this example, includes a database 214 similar to database 114 except additional information may be incorporated as digital certificates such as cryptographic communication rights among a plurality of constrained devices. For example, a certificate may indicate that constrained device 209 may communicate with other specified constrained devices 210 or unconstrained devices (not shown) in the network. Each constrained device 209-210 has a corresponding certificate or token indicating its cryptographic communication rights.

Cryptographic communication rights, for example, indicate which cryptographic functions may be employed by a particular device. Differing cryptographic functions may include by way of example, and not limitation, a data encryption function, a key encryption function, a data signature function, a key agreement function, and a data digest function. The stored software modules corresponding to each of the cryptographic functions are referred to herein as cryptographic code modules. The single cryptographic code modules may be stored for each cryptographic function in each constrained device. As such, each of the plurality of constrained devices 209-210 include no more than one cryptographic algorithm code module per cryptographic function. The function may employ any suitable cryptographic format such as Elliptic Curve Cryptography (ECC), RSA or any other suitable format. The devices 209 and 210 are constrained such that they do not store more than a single cryptographic algorithm code module per cryptographic function.

The database 214 may be any suitable distributed database or local database stored in any suitable memory such as DRAM, ROM, RAM, or any other suitable storage medium that stores digital information. The authorization server 202 checks that all constrained devices that are permitted to communicate with each are programmed with compatible cryptographic algorithms and corresponding keys. If a particular cryptographic algorithm has to be updated for various reasons such as the algorithm is no longer strong enough for a particular application, or for any other reason, the network management device can suspend sub-sets of the constrained devices 209-210 and the software update server can update their respective cryptographic algorithms and keys and then the network management device can lift the suspension. In this way, all communicating parties are ensured at all times that they have compatible cryptographic algorithms and keys.

Figure 3:
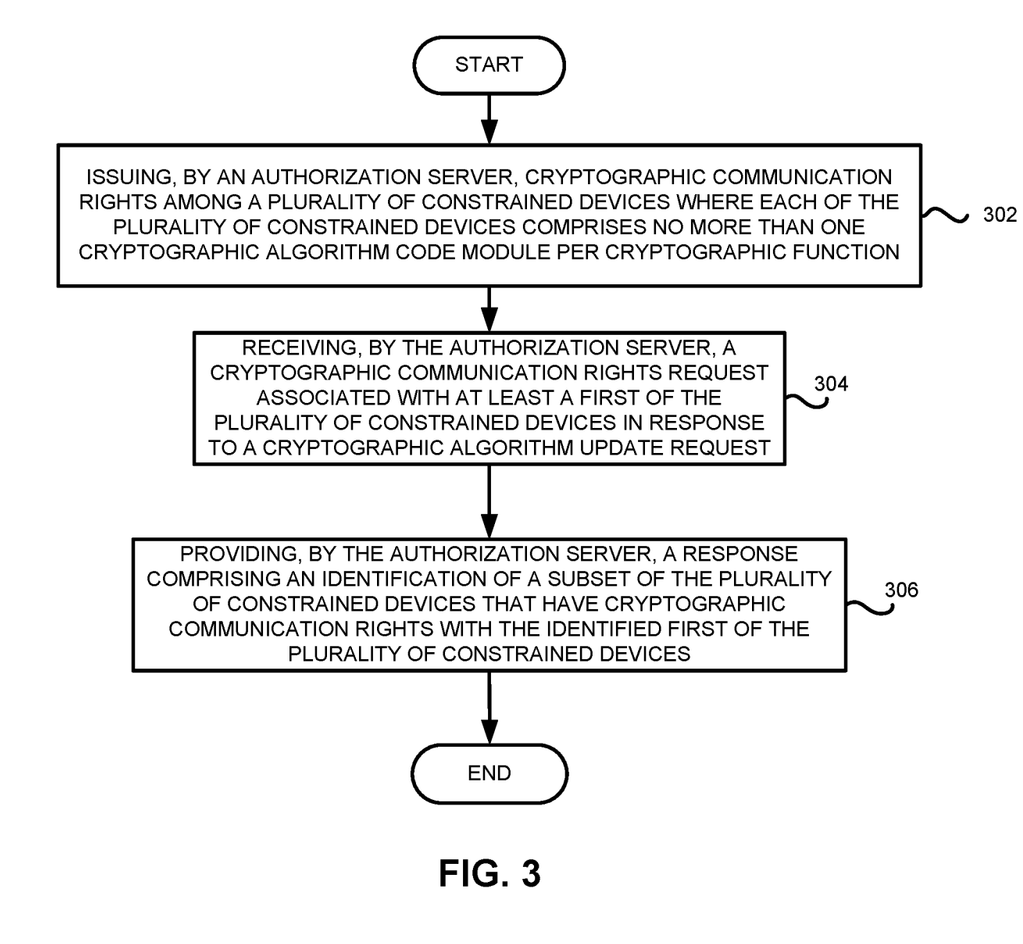
FIG. 3 is a flowchart illustrating one example of a method for secure communication between constraint devices in accordance with one example set forth in the disclosure.
Figure 5:
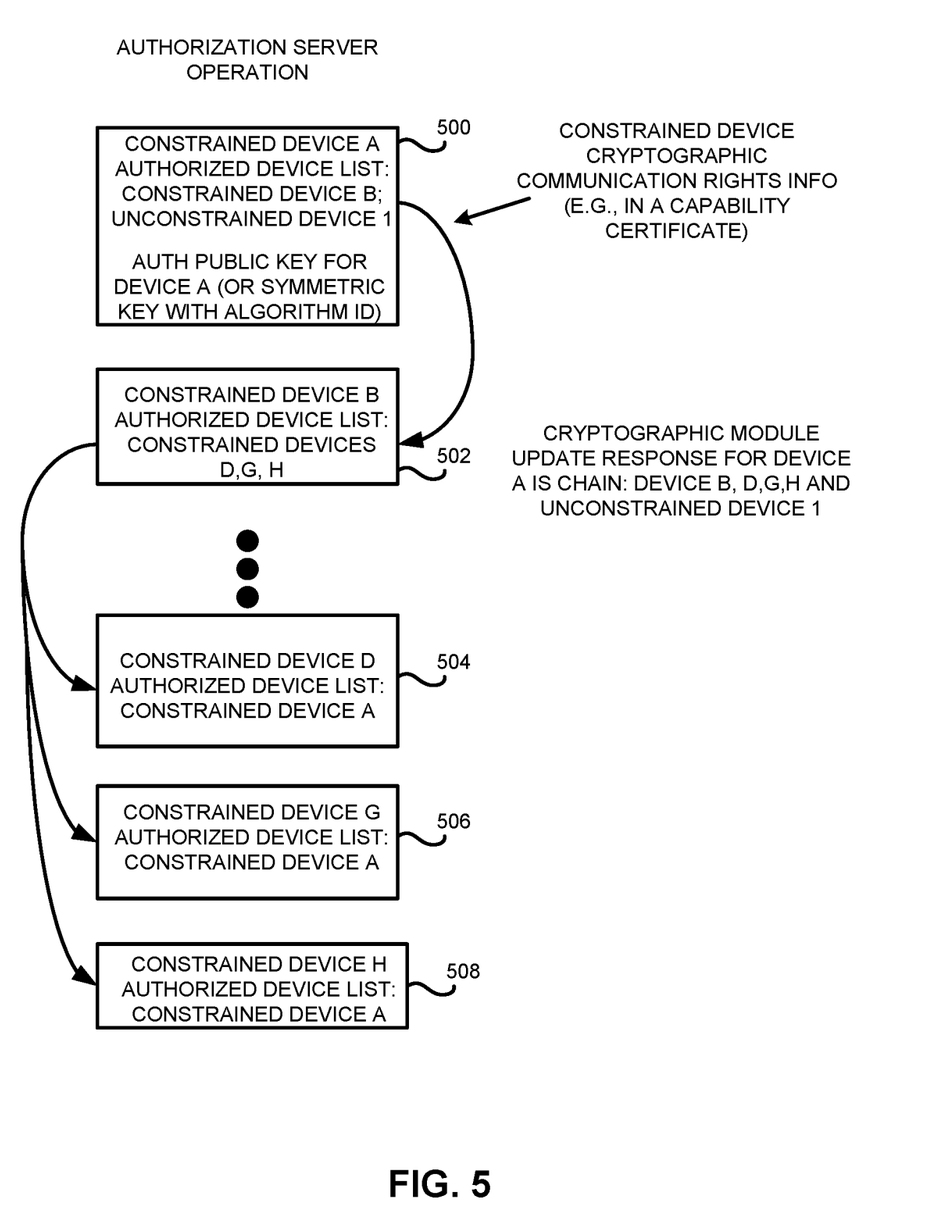
FIG. 5 is a diagram illustrating one example of issued cryptographic communication rights in the form of digital certificates or tokens for a plurality of constrained devices in accordance with one example set forth in the disclosure.

Referring also to FIGS. 3 and 5, a method for secure communication between constrained devices includes as shown in block 302, issuing by the authorization server 202 cryptographic communication rights such as certificates or tickets or other cryptographic token, among a plurality of constrained devices 209-210 where each of the plurality of constrained devices includes no more than one cryptographic algorithm code module per cryptographic function. An example of a certificate for constrained device 209 is shown as certificate 500 where it includes data representing cryptographic communication rights showing that constrained device A is authorized to communicate with constrained device B as well as unconstrained device 1. The cryptographic communication rights 500 also include, in this example, an authentication public key for device A along with the cryptographic algorithm identifier that device A is able to use. Similarly, cryptographic communication rights 502, 504, 506 and 508 are provided for other constrained devices such as device B, device D, device G and device H (these devices are not shown in FIG. 2 for simplicity purposes). As such, the authorization server 202 issues in this example, public key certificates, signed by the authorization server or other root authenticator, expressing the subject constrained device's public key and its capabilities. The subject in this case is an identifier for the constrained device to whom the certificate is issued. An object, such as other devices with whom the subject is permitted to communicate and if desired, an action the subject is permitted to perform on the object. Although this example employs public key cryptography techniques, symmetric key techniques may also be employed if desired.

Cryptographic communication rights can also be expressed as certificates with permissions in which the certificate identifies the object and the permissions identify the subjects and the action the subject is permitted to perform. The constrained devices may be identified by name such as a DNS name or an address such as an IPv6 address, or any other suitable identifier. The authorization server 202 certifies the assigned rights and as such, knows which constrained devices (and unconstrained devices if they are in a network) are permitted to talk to with each other in the network. The authorization server 202 is then able to identify which cryptography communication links would break should any of the identities replace its cryptographic algorithm code module.

In the example shown in FIG. 5, a cryptographic communication rights chain is determined by the authorization server 202 by looking at each of the certificates based on the subject (Device ID) that are included in any certificate. By way of example, device A is authorized to cryptographically communicate with device B (meaning that they both have the same cryptographic code modules for respective cryptographic functions) and device B is authorized to communicate cryptographically with constrained devices D, G and H and constrained devices D, G and H are each authorized to communicate with constrained device A. As such, having to update a cryptographic code module for device A would require updating the same cryptographic code module resident in constrained devices B, D, G and H for these devices to communicate properly with one another from a cryptographic perspective. As such, the authorization server 202 utilizes a method for identifying incompatible cryptographic algorithm provisioning based on cryptographic communication rights for constrained devices. As noted above, each cryptographic code module implements no more than one algorithm per key usage or per cryptographic function in order to minimize the amount of memory required to store the cryptographic codes. Key uses also referred to as cryptographic functions include without limitation data encryption, key encryption, data signature generation, key agreement and data digests as noted above.

Referring back to FIG. 3, the method as shown in block 304 includes receiving, by the authorization server 202, a cryptographic communication rights request 220 which seeks a list of constrained devices that require common cryptographic code modules to communicate. In this example, the network management device 204 sends the request 220. As noted, this request 220 asks the authorization server 202 to provide the list of the devices that are affected by a necessary update to a cryptographic code module. A cryptographic algorithm update request 222 may be used to initiate a cryptographic code module update (i.e., software update). This cryptographic algorithm update request 222 may be received by the software update server, or the network management device 204. By way of example, the update request 222 may come through an administrator terminal requiring an improved level of security and hence, an upgrade in a key size or differing cryptographic algorithm such as an RSA to elliptic curve algorithm. The cryptographic algorithm update request 222 may also be generated automatically from another server or another process as desired. As such, as one example, issuing the cryptographic communication rights request can be done by the software update server in response to the software update server receiving the cryptographic algorithm update request. Likewise, as another example, issuing the cryptographic communication rights request can be done by the network management device in response to the network management device receiving the cryptographic algorithm update request.

As shown in block 306, the method include providing by the authorization server 202, a response 224 including an identification of a sub-set of the plurality of constrained devices that have cryptographic communication rights in common with the identified first of the plurality of constrained devices. For example, if the first device was device A, a response 224 from the authorization server 202 would send the response for device A listing the other constrained devices and unconstrained devices for which device A has the cryptographic communication right to communicate with using the same cryptographic code modules. In this example, it would include device B, device D, device G and device H (see FIG. 5). This list of devices may be, for example, a list of device IDs as part of the response 224 to the network management device. This is shown in block 306.

Figure 4:
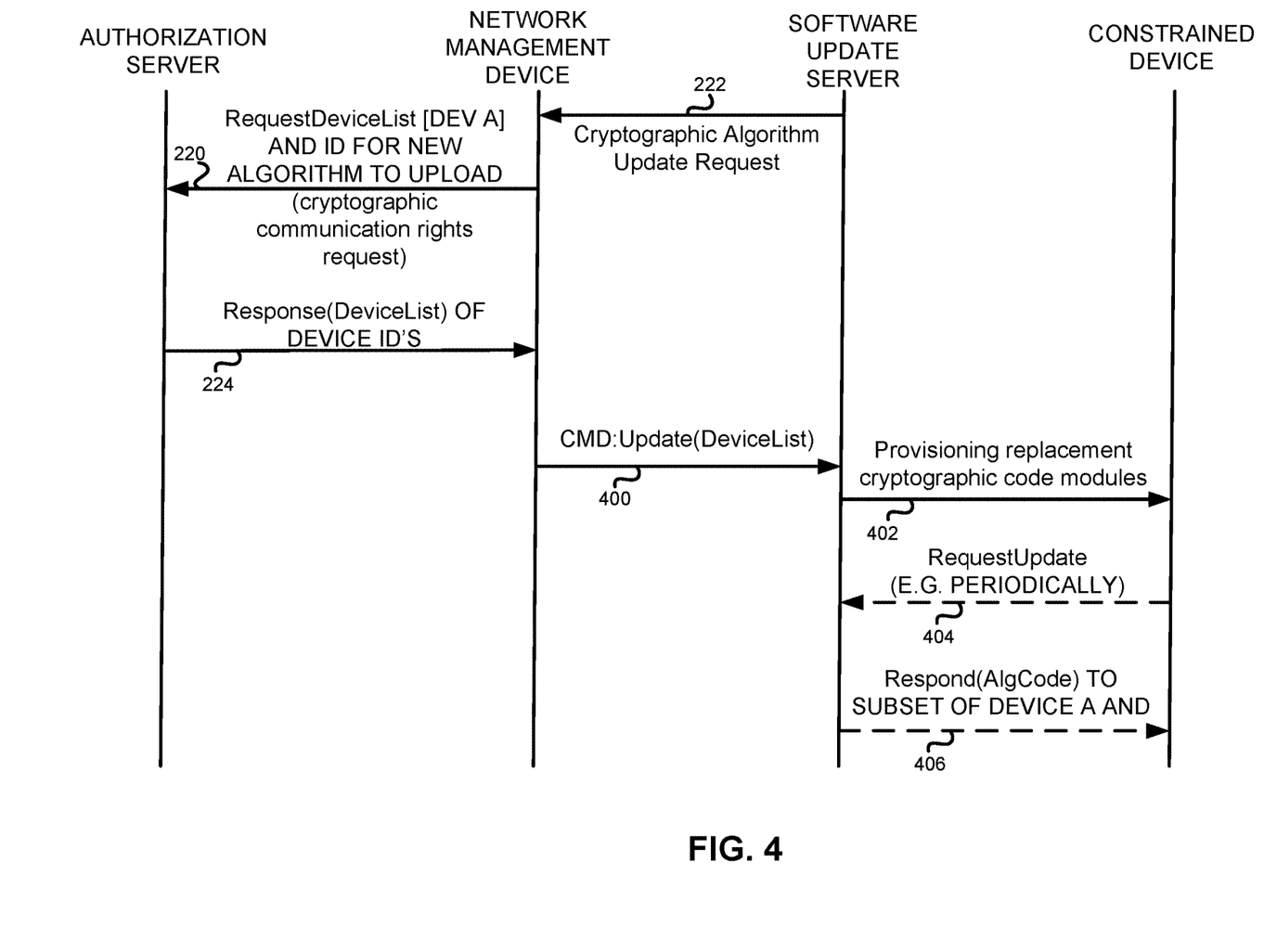
FIG. 4 is a diagram illustrating one example of a method for secure communication between constraint devices in accordance with one example set forth in the disclosure.

Referring to FIGS. 2 and 4, the communications described are diagrammed in both figures. Once the response with the device list 224 is sent to the network management device 204, the network management device 204 may send a command 400 to the software update server 206 instructing the software update server 206 to update the respective cryptographic code modules in each of the constrained devices listed in the device list. The software update server 206 then provisions the cryptographic code modules shown by communication 402 to each of the constrained devices listed in the device list. These constrained devices are a sub-set of the total number of constrained devices in the network. As previously noted, this may include suspending these devices until the software update is complete and then allow the constrained devices to reassert themselves in a network. The device can be placed in "silent" mode by a command from the network management device, in which the device neither initiates nor accepts messages from devices other than the network management device. It will be recognized that the operations described herein may be suitably distributed among the various devices in the network depending upon the desired topology of the network.

Also illustrated in FIG. 4 are dashed lines 404 and 406 illustrating operations that may occur periodically between the constrained device and the software update server. The constrained device may initiate a software update request 404 to the software update server and, if the network management device 204 has sent a command 400 to the software update server 206 instructing the software update server 206 to update the respective cryptographic code module, then the software update server may then send a response 406 with the new cryptographic code module to the requesting device.

Referring again to FIG. 5, the response 224 includes the identification of the sub-set of the plurality of constrained devices that have cryptographic communication rights in common. The method includes determining which of the plurality of constrained devices have cryptographic communication rights in common with the identified first constrained device based on authorized communication rights that are authorized by the authorization server. This is done by, for example, evaluating the chain of certificates that identify common constrained devices as illustrated in FIG. 5. Examples of standard format for key certificates include X.509, PGP, PEM, PKIX, PKCS #7, PublickeyInfo, and SHA-1 and other suitable formats known in the art.

The method also includes, for example as noted above, provisioning, by the software update server, a replacement cryptographic code module in response to the cryptographic algorithm update request 222 such that the provisioning is to the sub-set of the plurality of constrained devices that have cryptographic communication rights in common with the identified first of the plurality of constrained devices.

The authorization server issues the cryptographic communication rights (certificates, tickets or other tokens) among the plurality of constrained devices by, in one example, issuing asymmetric key based configuration certificates or symmetric key based tickets to the plurality of constrained devices. The configuration certificates or symmetric key tickets assign communication rights to each of the plurality of constrained devices to allow the plurality of constrained devices to cryptographically exchange information between the plurality of constrained devices and are cryptographically signed by the authorization server.

Figure 6:
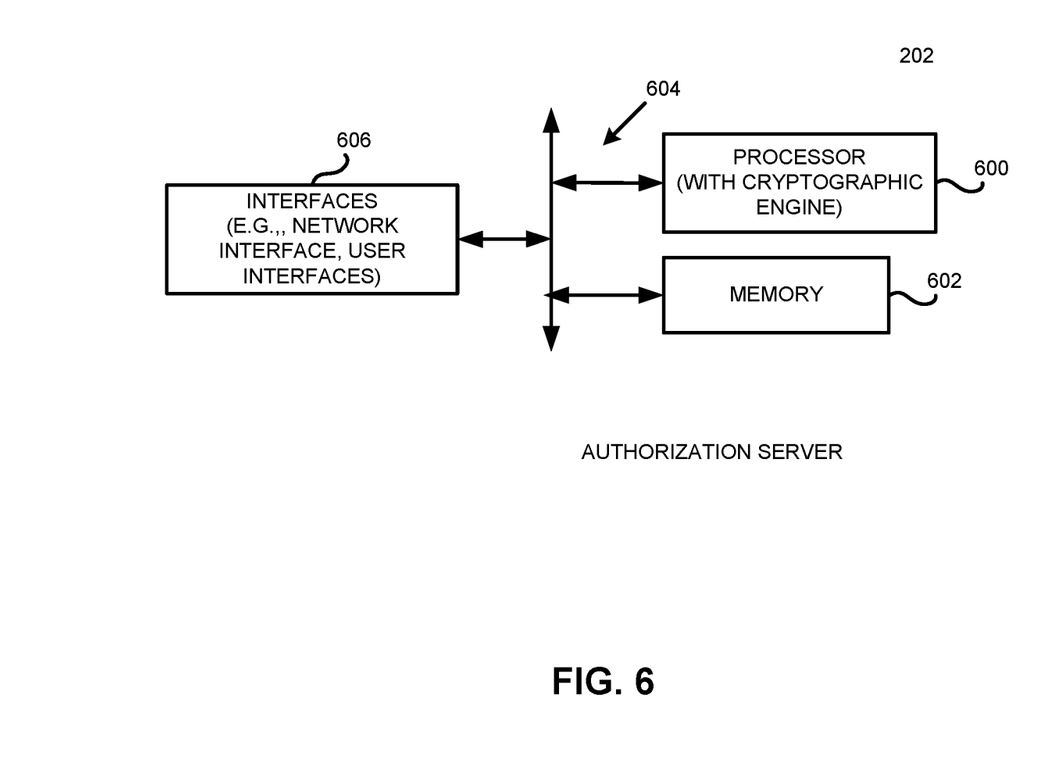
FIG. 6 is a block diagram illustrating one example of an authorization server in accordance with one example set forth in the disclosure.

FIG. 6 illustrates a block diagram of an authorization server 202 which may include logic such as one or more processors 600 such as CPUs, DSPs, or any other suitable processor(s) and memory 602 that may be accessible by the processor 600 through any suitable bus structure 604 as known in the art. The memory 602 may be any suitable memory including memory distributed through the network and/or local memory in the form of RAM, DRAM, ROM, EPROM or any other suitable memory. In this example, the memory 602 contains instructions that when executed cause the processor 600 to carry out the operations described herein. The processor 600 serves as logic that is operative to perform the functions when executing the stored code. The logic may also be implemented in any other suitable from such as application specific integrated circuits, state machines, or any suitable combination of hardware and stored software. The authorization server also includes, as known in the art, suitable interfaces 606 to provide interfaces to the network, user interfaces, or any other suitable interfaces that are needed by the authorization server. The software update server and network management server may include one or more processors, memory and interfaces to communicate with each other as known in the art. However, it will be recognized that the functions carried out by each of the servers can be combined onto or distributed amongst one or more servers as desired.

Figure 7:
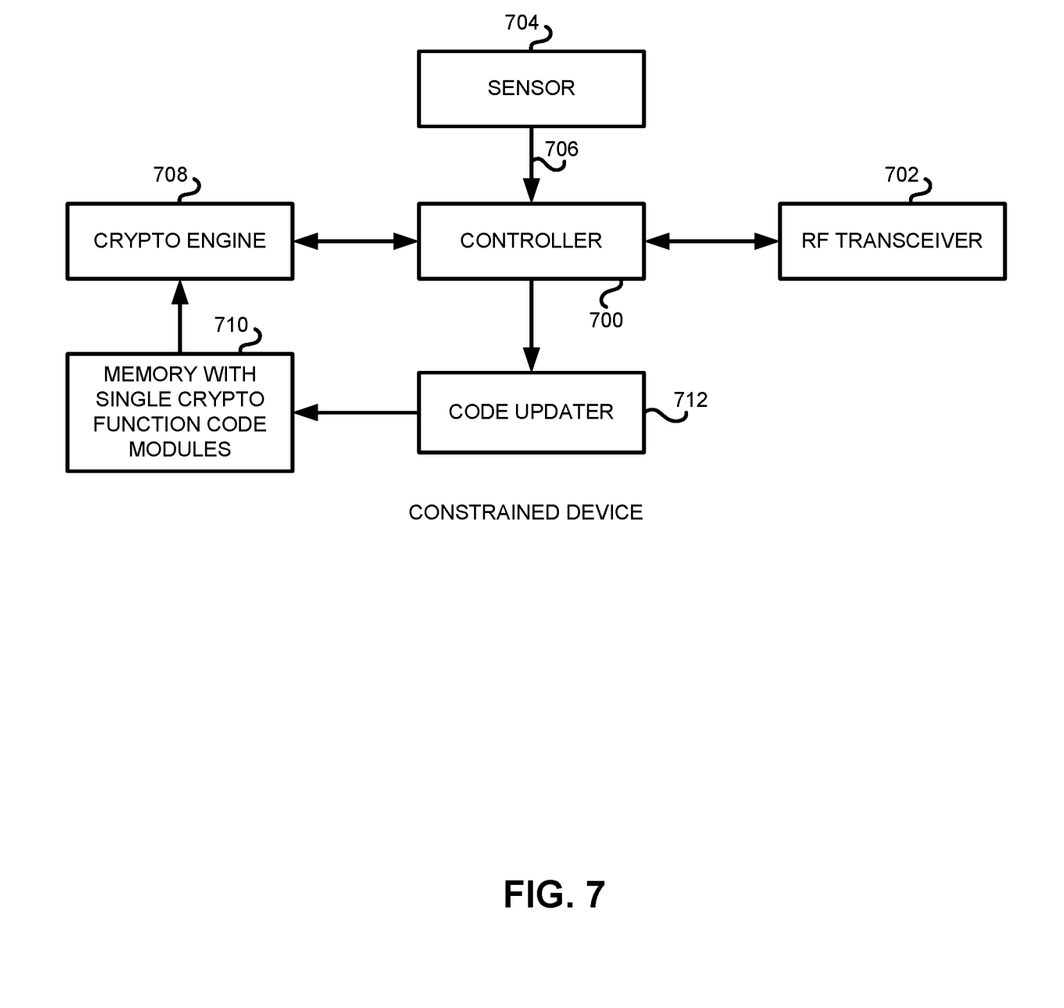
FIG. 7 is a block diagram illustrating one example of a constrained device in accordance with one example set forth in the disclosure.

FIG. 7 illustrates a block diagram of a constrained device 202 including a controller 700, such as a microprocessor, state machine, digital signal processor or any other suitable logic, a radio frequency transceiver 702 to communicate with other constrained devices, and in this example a sensor 704 such as a temperature sensor, pressure sensor or other sensor provides sensor information 706 to the controller which may then provide the information through the RF transceiver to the network as desired and as known in the art. A cryptographic engine 708 may be part of the controller 700 or its own hardware if desired and performs the cryptographic operations needed by the constrained device such as the cryptographic functions described herein. The cryptographic engine in this example executes the cryptographic code modules stored in memory 710 and is a programmable processor. However, any suitable logic may also be employed as noted above. A code updater 712 which may be, for example, executing software on the controller 700 changes or overwrites the current cryptographic code modules with a provisioned cryptographic code module to update the cryptographic code modules on the constrained device. Any suitable software update application or operation may be employed.

Among other advantages, a sub-set of constrained devices may be identified that require a common cryptographic code module software update. The constrained devices may be low cost devices with single cryptographic function operation to improve network costs. The system effectively checks that all devices permitted to communicate with each other are programmed with compatible cryptographic algorithms and keys. When deprecating a particular cryptographic algorithm from a constrained device, the authorization server suspends sub-sets of the constrained devices in the network causes update of the sub-sets of cryptographic algorithms and keys, then lifts the suspension. In this way, the authorization server can ensure that all communicating parties, at all times, have compatible cryptographic algorithms and keys.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for secure communication between constrained devices comprising:
   issuing, by an authorization server, cryptographic communication rights among a plurality of constrained devices where each of the plurality of constrained devices comprises no more than one cryptographic algorithm code module per cryptographic function wherein issuing comprises issuing asymmetric key based configuration certificates or symmetric key based tickets to the plurality of constrained devices that include data identifying at least other constrained devices of the plurality of constrained devices with whom a subject constrained device is permitted to cryptographically communicate with to allow the plurality of constrained devices to cryptographically exchange information between specified ones of the plurality of constrained devices;
   receiving, by the authorization server, a cryptographic communication rights request associated with at least a first of the plurality of constrained devices in response to a cryptographic algorithm update request that requests a replacement cryptographic code module update for a constrained device;
   providing, by the authorization server, a response to the cryptographic communication rights request that requests a replacement cryptographic code module update, comprising an identification of a subset of the plurality of constrained devices that have cryptographic communication rights in common with the identified first of the plurality of constrained devices;
   wherein providing, by the authorization server, the response comprising the identification of the subset of the plurality of constrained devices that have cryptographic communication rights comprises determining which of the plurality of constrained devices have cryptographic communication rights with the identified first constrained device based on authorized communication rights authorized by the authorization server; and
   wherein the issued asymmetric key based configuration certificates or symmetric key based tickets further include data identifying an action that the subject constrained device is permitted to perform on another constrained device.

2. The method of claim 1 comprising provisioning, by a software update server, the replacement cryptographic code module, in response to the cryptographic algorithm update request, to the subset of the plurality of constrained devices that have cryptographic communication rights with the identified first of the plurality of constrained devices, wherein the replacement cryptographic code module comprises at least one of: a data encryption code module, a key encryption code module, a data signature code module, a key agreement code module and a data digest code module.

3. The method of claim 1 comprising issuing the cryptographic communication rights request by a software update server in response to the software update server receiving the cryptographic algorithm update request.

4. The method of claim 1 comprising issuing the cryptographic communication rights request by a network management device in response to the network management device receiving the cryptographic algorithm update request.

5. An apparatus comprising:
   one or more hardware processors operative to:
      issue cryptographic communication rights among a plurality of constrained devices where each of the plurality of constrained devices comprises no more than one cryptographic algorithm code module per cryptographic function;
      receive a cryptographic communication rights request associated with at least a first of the plurality of constrained devices in response to a cryptographic algorithm update request that requests a replacement cryptographic code module update for a constrained device;
      provide a response to the cryptographic communication rights request that requests a replacement cryptographic code module update, comprising an identification of a subset of the plurality of constrained devices that have cryptographic communication rights in common with the identified first of the plurality of constrained devices;
      determine which of the plurality of constrained devices have cryptographic communication rights with the identified first constrained device based on authorized communication rights authorized by the authorization server,
   wherein the one or more processors is operative to issue asymmetric key based configuration certificates or symmetric key based tickets to the plurality of constrained devices that include data identifying at least other constrained devices of the plurality of constrained devices with whom a subject constrained device is permitted to cryptographically communicate with to allow the plurality of constrained devices to cryptographically exchange information between specified ones of the plurality of constrained devices; and
   wherein the issued asymmetric key based configuration certificates or symmetric key based tickets further include data identifying an action that the subject constrained device is permitted to perform on another constrained device.

6. A system comprising:
   a plurality of constrained devices;
   an authorization server, operatively coupled to the plurality of constrained devices, comprising logic operative to:
      issue cryptographic communication rights among the plurality of constrained devices where each of the plurality of constrained devices comprises no more than one cryptographic algorithm code module per cryptographic function wherein issuing comprises issuing asymmetric key based configuration certificates or symmetric key based tickets to the plurality of constrained devices that include data identifying at least other constrained devices of the plurality of constrained devices with whom a subject constrained device is permitted to cryptographically communicate with to allow the plurality of constrained devices to cryptographically exchange information between specified ones of the plurality of constrained devices and wherein the issued asymmetric key based configuration certificates or symmetric key based tickets further include data identifying an action that the subject constrained device is permitted to perform on another constrained device;
      receive a cryptographic communication rights request associated with at least a first of the plurality of constrained devices in response to a cryptographic algorithm update request that requests a replacement cryptographic code module update for a constrained device; and provide a response to the cryptographic communication rights request that requests a replacement cryptographic code module update, comprising an identification of a subset of the plurality of constrained devices that have cryptographic communication rights in common with the identified first of the plurality of constrained devices;

determine which of the plurality of constrained devices have cryptographic communication rights with the identified first constrained device based on authorized communication rights authorized by the authorization server, and a software update server, operatively coupled to the plurality of constrained devices and to the authorization server, comprising logic operative to provision a replacement cryptographic code module, in response to the cryptographic algorithm update request, to a subset of a plurality of constrained devices that have cryptographic communication rights with an identified first of the plurality of constrained devices, wherein the replacement cryptographic code module comprises at least one of: a data encryption code module, a key encryption code module, a data signature code module, a key agreement code module and a data digest code module.

7. The system of claim 6 comprising a network management server operative to send the cryptographic communication rights request.

* * * * *